United States Patent
Thubert et al.

(10) Patent No.: US 10,080,226 B2
(45) Date of Patent: Sep. 18, 2018

(54) TIMESLOT SHIFTING FOR LOWER-PRIORITY PACKET IN A TIME SLOTTED NETWORK

(71) Applicant: Cisco Technology, Inc., San Jose, CA (US)

(72) Inventors: Pascal Thubert, La Colle sur Loup (FR); Zacharie Denis Brodard, Paris (FR); Hao Jiang, Malakoff (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 50 days.

(21) Appl. No.: 15/207,621

(22) Filed: Jul. 12, 2016

(65) Prior Publication Data
US 2018/0020447 A1   Jan. 18, 2018

(51) Int. Cl.
*H04W 72/04*   (2009.01)
*H04W 72/12*   (2009.01)
*H04W 74/08*   (2009.01)
*H04W 72/10*   (2009.01)

(52) U.S. Cl.
CPC ....... *H04W 72/0446* (2013.01); *H04W 72/10* (2013.01); *H04W 72/121* (2013.01); *H04W 74/0825* (2013.01)

(58) Field of Classification Search
CPC .......... H04W 72/10; H04W 72/0446; H04W 72/121
See application file for complete search history.

(56) References Cited

U.S. PATENT DOCUMENTS

| | | | |
|---|---|---|---|
| 5,784,375 A | 7/1998 | Kalkunte et al. | |
| 7,187,691 B2 | 3/2007 | Gavette | |
| 7,352,770 B1 | 4/2008 | Yonge, III et al. | |
| 7,583,596 B1 * | 9/2009 | Frink | H04L 12/5601 370/230.1 |

(Continued)

OTHER PUBLICATIONS

Thubert, Ed. et al., "An Architecture for IPv6 over the TSCH mode of IEEE 802.15.4e", 6TiSCH, Internet-Draft, [online], Oct. 27, 2014, [retrieved on Dec. 11, 2015]. Retrieved from the Internet: URL: <https://tools.ietf.org/pdf/draft-ietf-6tisch-architecture-04.pdf>, pp. 1-32.

(Continued)

*Primary Examiner* — Michael Thier
*Assistant Examiner* — Zhensheng Zhang
(74) *Attorney, Agent, or Firm* — Leon R. Turkevich

(57) ABSTRACT

In one embodiment, a method comprises a network device identifying, in a time slotted network allocated timeslots for exclusive control of data transmissions with at least a second network device, a first schedule of first timeslots allocated for transmission and reception of packets having a first priority and a second schedule of second timeslots allocated for transmission and reception of packets having a second priority lower than the first priority, the second schedule overlapping the first schedule; and the network device shifting the second schedule of timeslots, relative to the first schedule, by a slot-frame shift (SFS) interval that causes a corresponding listen-before-talk interval in each of the second timeslots to be initiated coincident with or after transmission is enabled for any packet having the first priority.

17 Claims, 9 Drawing Sheets

(56) References Cited

U.S. PATENT DOCUMENTS

| | | |
|---|---|---|
| 7,756,090 B2 | 7/2010 | del Prado Pavon et al. |
| 2005/0025176 A1 | 2/2005 | Ko et al. |
| 2016/0143014 A1* | 5/2016 | Mukherjee ........ H04W 74/0816 370/330 |

OTHER PUBLICATIONS

Watteyne, "IEEE802.15.4e", [online], Nov. 19, 2012, [retrieved on Jun. 29, 2016]. Retrieved from the Internet: URL: <https://openwsn.atlassian.net/wiki/display/OW/IEEE802.15.4e>, 4 pages.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Vasseur, "Terms Used in Routing for Low-Power and Lossy Networks", Internet Engineering Task Force (IETF), Request for Comments: 7102, Jan. 2014, pp. 1-8.

Wikpedia, "ALOHAnet", [online], May 23, 2016, [retrieved on Jun. 27, 2016]. Retrieved from the Internet: URL: <https://en.wikipedia.org/w/index.php?title=ALOHAnet&printable=yes>, pp. 1-8.

Wikipedia, "IEEE 802.11e-2005", [online], Mar. 4, 2016, [retrieved on Jul. 1, 2016]. Retrieved from the Internet: URL: <https://en.wikipedia.org/w/index.php?title=lEEE_802.11e-2005&printable=yes>, pp. 1-6.

Thubert et al., "IETF 6TSCH: Combining IPv6 Connectivity with Industrial Performance", 2013 Seventh International Conference on Innovative Mobile and Internet Services in Ubiquitous Computing, IEEE, Jul. 3, 2013, XP032485811, pp. 541-546.

Alapati et al., "Carrier Sense Multiple Access & Collision Avoidance-Visualisation Teaching Tool (CSMA/CA-VTT)", International Journal of Scientific and Research Publications, vol. 2, Issue 12, Dec. 2012, 6 pages.

Vilajosana et al., "Minimal 6TiSCH Configuration", [online], Jan. 16, 2016, [retrieved on Jan. 27, 2016]. Retrieved from the Internet: <URL: https://tools.ietf.org/pdf/draft-ietf-6tisch-minimal-14.pdf>, pp. 1-28.

Palattella, et al., "Terminology in IPv6 over the TSCH mode of ISSS 802.15.4e", [online], Nov. 2, 2015, [retrieved on Jan. 27, 2016]. Retrieved from the Internet: <URL: https://tools.ietf.org/pdf/draft-ieff-6tisch-terminology-06.pdf>, pp. 1-14.

Watteyne et al., "Using IEEE 802.15.4e Time-Slotted Channel Hopping (TSCH) in the Internet of Things (loT): Problem Statement", Internet Engineering Task Force, Request for Comments: 7554, May 2015, pp. 1-23.

Thubert et al., U.S. Appl. No. 14/950,459, filed Nov. 24, 2015.
Wetterwald et al., U.S. Appl. No. 15/089,711, filed Apr. 4, 2016.
Wetterwald et al., U.S. Appl. No. 15/089,731, filed Apr. 4, 2016.
Thubert et al., U.S. Appl. No. 15/055,690, filed Feb. 29, 2016.

\* cited by examiner

SFS FOR LOST-SLOT AVOIDANCE IN NETWORK DEVICE HAVING MULTIPLE PRIORITIES, SET LBT TO START AT OR AFTER LATEST INSTANCE FOR INITIATING RECEPTION OF HIGHER PRIORITY PACKET (E.G., END OF tsRx WAIT FOR P0):

1) SFS = tsRxOffSet + tsRx WAIT + tsRxTx − tsTXOffSet (GUARD TIME UNBALANCED)
2) SFS = tsRx WAIT/2 + tsRxTx (GUARD TIME BALANCED);
3) E.G., SFS = 1392 μs (USING IEEE 802.15.4E DEFAULT TIMESLOT VALUES) — 70

SFS FOR COLLISION AVOIDANCE BETWEEN NETWORK DEVICES HAVING COINCIDING TIMESLOTS FOR DIFFERENT PRIORITIES, SET LBT TO START AT OR AFTER EARLIEST TX INSTANCE (E.G., END OF tsTXOffSet FOR P0):

1) MINIMAL SFS = tsCCA + tsRxTx (NO GUARD TIME, DEVICES "SUBSTANTIALLY" SYNCHRONIZED, E.G., WITHIN AROUND 32-64 μs);
2) SFS ≥ tsRx WAIT + tsRxOffSet − tsCCAOFFSET (GUARD TIME UNBALANCED);
3) SFS ≥ tsRx WAIT/2 + tsRxTx + tsCCA (GUARD TIME BALANCED);
4) E.G., SFS = 1520 μs (USING IEEE 802.15.4E DEFAULT TIMESLOT VALUES) — 84

EXTEND DURATION OF LBT IN SHIFTED TIMESLOT TO ENABLE DETECTION OF HIGHER-PRIORITY PACKET TRANSMISSION AND/OR HIGHER-PRIORITY ACK TRANSMISSION E.G.:

1) tsCCA > tsRxAckDelay + tsAckWait
2) E.G., tsCCA > 1400 μs (USING IEEE 802.15.4E DEFAULT TIMESLOT VALUES) — 90

FIG. 4B

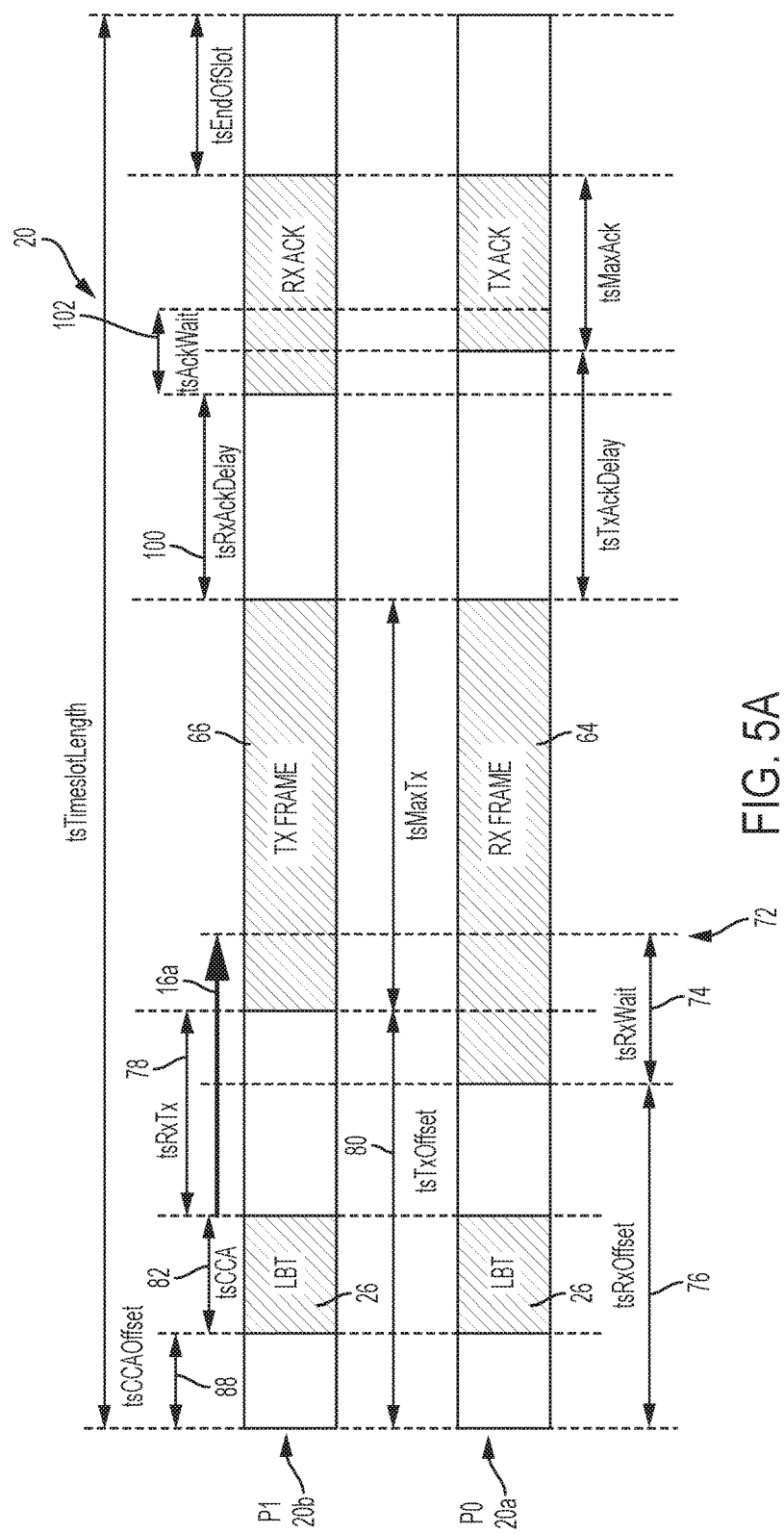

US 10,080,226 B2

TIMESLOT SHIFTING FOR LOWER-PRIORITY PACKET IN A TIME SLOTTED NETWORK

TECHNICAL FIELD

The present disclosure generally relates to a network device using timeslot shifting for a lower-priority packet in a time slotted data network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Engineering Task Force (IETF) is attempting to propose standards that can be applied to wireless devices for the stringent requirements of deterministic networks (e.g., minimal jitter, low latency, minimal frame loss). For example, Low power and Lossy Networks (LLNs) allow a large number (e.g., tens of thousands) of resource-constrained devices (e.g., sensors or "motes") to be interconnected to form a wireless mesh network. The IETF has proposed a routing protocol ("6TiSCH") that provides IPv6 routing using time slotted channel hopping (TSCH) based on IEEE 802.15.4e, enabling LLN devices to use low-power operation and channel hopping for higher reliability. The 6TiSCH architecture specifies a Channel distribution/usage (CDU) matrix of "cells", each cell representing a unique wireless channel at a unique timeslot following an initial epochal time (T=0).

Hence, a TSCH schedule can be allocated to a network device based on broadcast of a beacon message, where a network device can identify a prescribed allocated channel hopping sequence based on receiving a unique sequence offset that identifies a shifted position within a repeating (i.e., circular) default channel hopping sequence, relative to a timeslot value (e.g., an Absolute Slot Number (ASN)). A problem exists, however, that time slotted schedules can interfere with each other.

BRIEF DESCRIPTION OF THE DRAWINGS

Reference is made to the attached drawings, wherein elements having the same reference numeral designations represent like elements throughout and wherein:

FIGS. 4A and 4B illustrate an example method of shifting, in the time slotted network of FIG. 1, the second schedule by the SFS interval relative to the first schedule, according to an example embodiment.

FIGS. 5A-5D illustrate example shifting of the second schedule by example SFS intervals, according to an example embodiment.

DESCRIPTION OF EXAMPLE EMBODIMENTS

Overview

Figure 1:
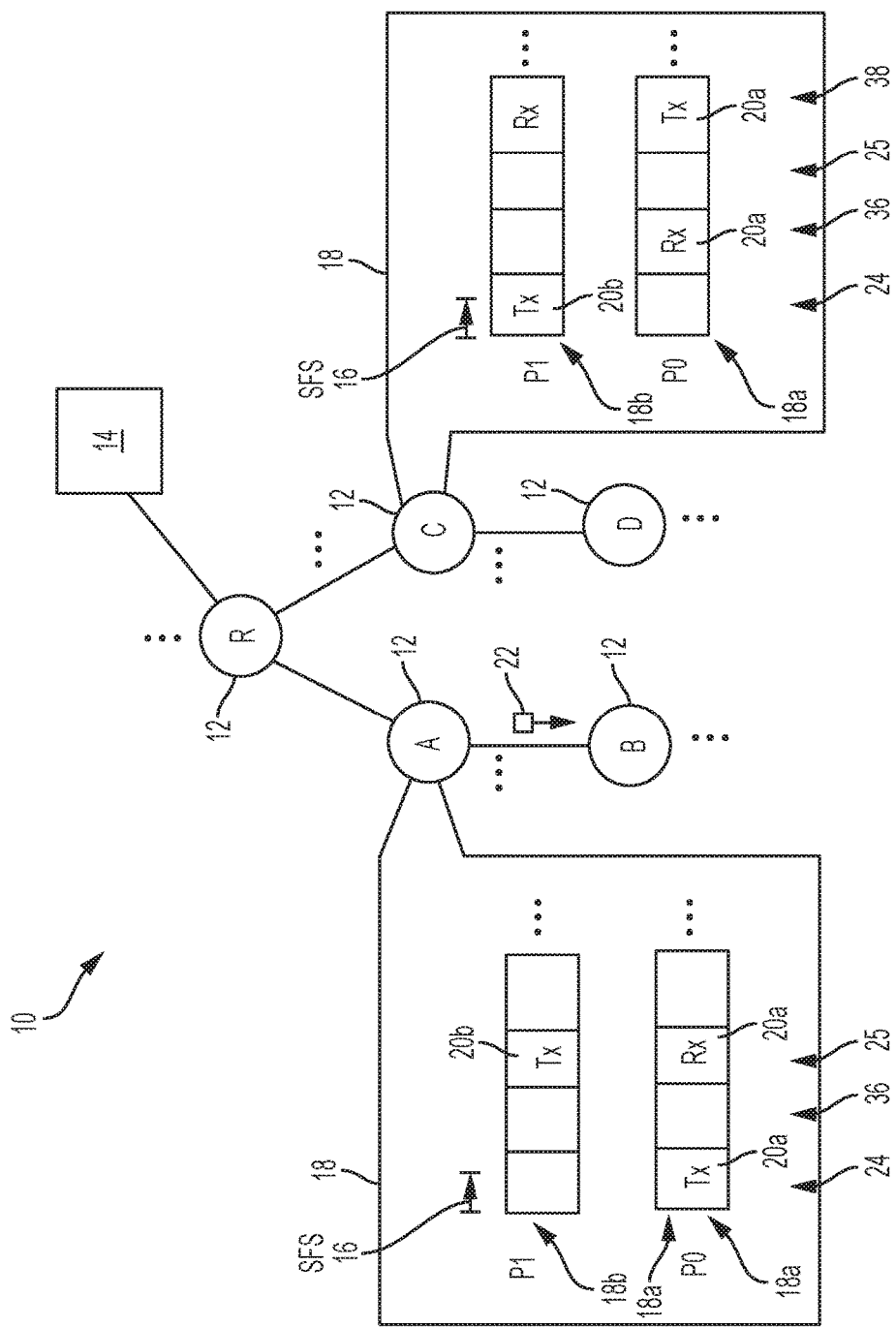
FIG. 1 illustrates an example time slotted data network having an apparatus for shifting, by a slot-frame shift (SFS) interval, a second schedule of second timeslots allocated for second priority packets, relative to a first schedule of first timeslots allocated for first priority packets having a higher priority than the second priority packets, according to an example embodiment.

In one embodiment, a method comprises a network device identifying, in a time slotted network allocated timeslots for exclusive control of data transmissions with at least a second network device, a first schedule of first timeslots allocated for transmission and reception of packets having a first priority and a second schedule of second timeslots allocated for transmission and reception of packets having a second priority lower than the first priority, the second schedule overlapping the first schedule; and the network device shifting the second schedule of timeslots, relative to the first schedule, by a slot-frame shift (SFS) interval that causes a corresponding listen-before-talk interval in each of the second timeslots to be initiated coincident with or after transmission is enabled for any packet having the first priority.

In another embodiment, an apparatus comprises a processor circuit and a device interface circuit. The processor circuit is configured for identifying, in a time slotted network allocated timeslots for exclusive control of data transmissions, a first schedule of first timeslots allocated for transmission and reception of packets having a first priority and a second schedule of second timeslots allocated for transmission and reception of packets having a second priority lower than the first priority, the second schedule overlapping the first schedule; the processor circuit is further configured for shifting the second schedule of timeslots, relative to the first schedule, by a slot-frame shift (SFS) interval that causes a corresponding listen-before-talk interval in each of the second timeslots to be initiated coincident with or after transmission is enabled for any packet having the first priority. The device interface circuit is configured for transmitting one of the packets having the second priority, within a corresponding second timeslot, in response to a determined absence during the corresponding listen-before-talk interval of any packet having the first priority.

In another embodiment, one or more non-transitory tangible media are encoded with logic for execution by a machine. The one or more non-transitory tangible media encoded with the logic, when executed by the machine, is operable for: the machine implemented as a network device identifying, in a time slotted network allocated timeslots for exclusive control of data transmissions with at least a second network device, a first schedule of first timeslots allocated for transmission and reception of packets having a first priority and a second schedule of second timeslots allocated for transmission and reception of packets having a second priority lower than the first priority, the second schedule overlapping the first schedule; and the network device shifting the second schedule of timeslots, relative to the first schedule, by a slot-frame shift (SFS) interval that causes a corresponding listen-before-talk interval in each of the second timeslots to be initiated coincident with or after transmission is enabled for any packet having the first priority.

DETAILED DESCRIPTION

Particular embodiments enable optimized transmissions within a time slotted network of data packets having different priorities, based on shifting lower priority schedules allocated for lower-priority packets that are subordinate in priority to a higher-priority packet having their own schedule of timeslots. The lower priority schedules are shifted by a slot-frame shift (SFS) interval that enables a listen-before-talk (LBT) interval (e.g., a Clear Channel Assessment (CCA) interval) to detect any one of a higher-priority packet transmission and/or a higher-priority acknowledgement for the higher-priority packet. As described in further detail below, the SFS interval can eliminate collisions between different network devices having coinciding transmit slots for different priority packets; the SFS interval also can eliminate within a network device a "lost slot" where a lower-priority transmit slot would lose its opportunity to transmit a lower-priority data packet due to waiting too long while deferring to an overlapping higher-priority receive slot that is not used.

FIG. 1 illustrates an example wired or wireless time slotted data network 10 comprising apparatus devices 12, 14 configured for shifting, by a slot-frame shift (SFS) interval 16, a lower-priority schedule 18b of timeslots 20b allocated for lower priority packets "P1", relative to a higher-priority schedule 18a of timeslots 20a allocated for higher priority packets "P0" 22, according to an example embodiment. The data network 10 is a time slotted network that is allocated timeslots (e.g., by the controller device 14) for exclusive control of data transmissions between a network device (e.g., "A") 12 and at least a second network device (e.g., "B"); for example, the time slotted network 12 can be implemented as a 6TiSCH network having a channel distribution/usage (CDU) matrix that establishes a transmission schedule (i.e., a sequence of identified time slots 20) and a channel hopping sequence for each network device 12; the time slotted network also can be implemented as a slotted "ALOHA" network. The data network 10 illustrated in FIG. 1 can be a stand-alone data network, or can be part of a larger data network such as sensor network deployed as a RPL network under the IETF Request for Comments (RFC) 6550, a local area network coupled to a wide area network (WAN) (e.g., the Internet), etc.

The apparatus 14, implemented for example as a centralized path computation element (PCE) in a TSCH network or a network administrator device, can establish for each network device 12 a corresponding multi-priority schedule 18: the multi-priority schedule 18 comprises a higher-priority schedule ("first schedule") 18a of higher-priority timeslots ("first timeslots") 20a allocated for transmission and reception of packets having a highest priority ("first priority") "P0" and a lower-priority schedule ("second schedule") 18b of lower-priority timeslots ("second timeslots") 20b allocated for transmission and reception of packets having a lower priority ("second priority") that is lower than the first priority. As illustrated in FIG. 1, the lower-priority ("second") schedule 18b overlaps the higher-priority ("first") schedule 18a.

Hence, a data packet 22 can be transmitted by a network device 12 at an identified timeslot 20, for example within a specified frequency channel within a 6TiSCH network. A fundamental problem associated with prior implementations of a time slotted network (e.g., a 6TiSCH network) is that both ISA 100.A and IEEE 802.15.4 TSCH allow multiple schedules in a network device 12; hence, multiple schedules could interfere with each other based on coinciding timeslots within the same interference domain, either within a single network device (e.g., "A") 12 and/or between different network devices (e.g., "A" and "C").

For example, one problem with multiple schedules is the potential for collision between different network devices (e.g., "A" and "C"), having coinciding transmit slots "Tx" at event 24. As illustrated in FIG. 1, the network device "C" 12 may be unaware that the network device "A" 12 has a high-priority packet "P0" to transmit using the higher-priority timeslot 20a at event 24; hence, transmission of the lower-priority packet "P1" by the network device "C" 12 at the event 24 using its lower-priority timeslot 20b normally would cause a collision with the high-priority packet "P0".

Another problem with multiple schedules is the "lost slot" problem, where a network device (e.g., "A") 12 having schedules 18a, 18b for respective priorities "P0" and "P1" encounters a conflict where higher-priority receive slot "Rx" 20a at event 25 interferes with a lower-priority transmit slot "Tx" 20b. In particular, the network device "A" 12 at event 25 must grant priority to the higher-priority timeslot "Tx" 20a and must listen for some time (including a guard time) to determine if an incoming high-priority "P0" message is being transmitted by a transmitting node (e.g., the root network device "R" 12) at event 25; however, by the time the network device "A" 12 has determined that no high-priority message "P0" is being transmitted, the transmission opportunity for the lower-priority message "P1" using the lower-priority timeslot "Tx" 20b is lost. Hence, the "lost slot" problem would cause the higher-priority "Rx" timeslot 20a at event 25 to block the transmit opportunity of the lower-priority message "P1" at the lower-priority timeslot "Tx" 20b.

Figure 2:
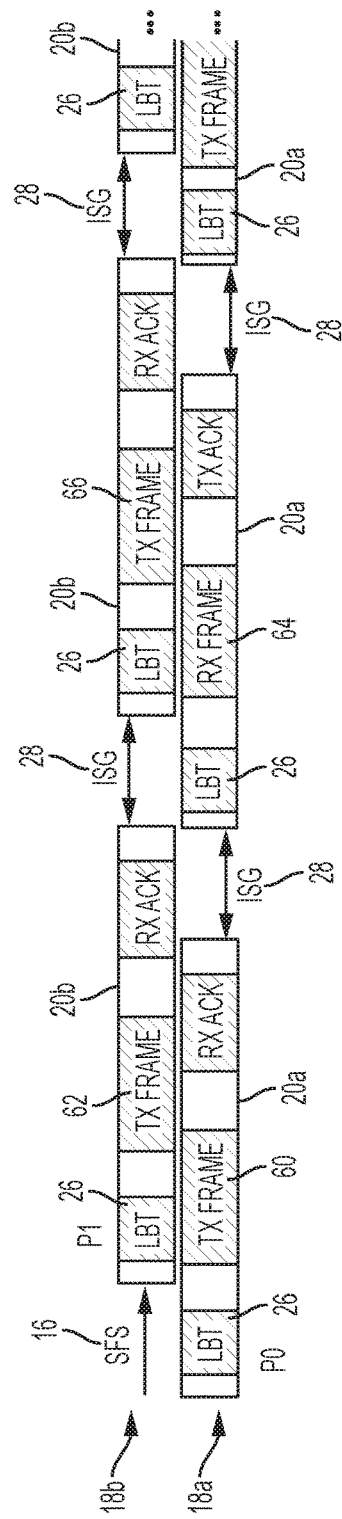
FIG. 2 illustrates the first schedule of first time slots allocated for first priority packets, and the shifting of the second schedule of second timeslots, by the SFS interval relative to the first schedule, according to an example embodiment.

According to example embodiments, each network device (e.g., "A", "B", "C", "D", "R", etc.) 12 in the data network 10 can shift its lower-priority schedules 18b by at least one slot-frame shift interval 16 that causes a corresponding listen-before-talk (LBT) interval (26 of FIG. 2) in each of the lower-priority timeslots 20b to be initiated coincident with, or after, transmission is enabled for any high-priority packet "P0" transmitted (or received) in any higher-priority timeslot 20a. As illustrated in FIG. 2, the listen-before-talk interval 26 in each lower-priority timeslot 20b can detect at least the transmission (or reception) of a higher-priority packet "P0" in an overlapping higher-priority timeslot 20a. Hence, the slot-frame shift interval 16 guarantees that the listen-before-talk interval 26 in each lower-priority timeslot 20b can detect whether a higher-priority packet "P0" is being transmitted (e.g., "Tx" or "TX FRAME") or received (e.g., "Rx" or "RX FRAME") within an overlapping higher-priority schedule 18a, and/or whether a corresponding higher-priority acknowledgement ("RX ACK" or "TX ACK") is being received or transmitted within the overlapping higher-priority schedule 18a.

FIG. 2 also illustrates that each network device 12 can append, to each of the timeslots 20a and 20b, an interslot gap (ISG) 28. As described in further detail below, a network device 12 is not limited to only two priorities (e.g., "P0", "P1"); rather, a network device 12 can have any number of priorities "i" that are successively lower than the highest priority "P0", in other words the priority "Pi" has a higher priority than "P(i+1)", where "i" equals the number of priorities lower than the highest priority "P0" (i=0). Consequently, the slot-frame shift interval 16 for each successively lower priority "Pi" is set to "SFSi=SFS*i" such that the schedule for priority "P1" packets is shifted by one slot-frame shift interval 16 (i.e., SFS_P1=SFS*1), the schedule for priority "P2" packets is shifted another slot-frame shift interval 16 (i.e., SFS_P2=SFS*2), the schedule for priority "P3" packets is shifted another slot-frame shift interval 16 SFS_P3=SFS*3), etc. (the symbol "*" as used herein refers to a multiplication operation).

Hence, each network device 12 can set the interslot gap interval 28 to equal the integer multiple "i" of the slot-frame shift interval 16, i.e., "ISG=i*SFS", to ensure the next subsequent transmission of the highest-priority packet "P0" using the higher-priority schedule 18a does not interfere with the preceding transmission/reception of the lowest-priority packet "Pi".

Figure 3:
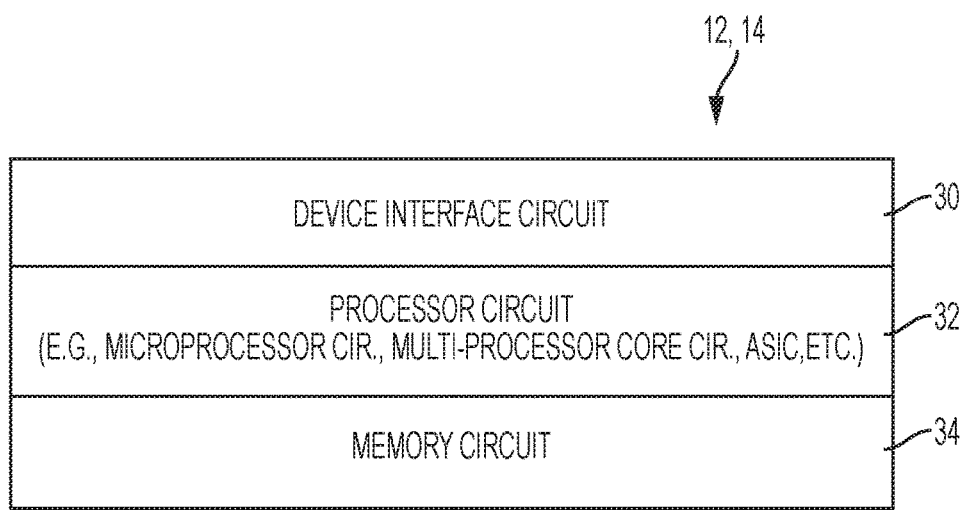
FIG. 3 illustrates an example implementation of any one of the network devices of FIG. 1, according to an example embodiment.

FIG. 3 illustrates an example implementation of any one of the devices 12, 14 of FIG. 1A, according to an example embodiment. Each apparatus 12, 14 is a physical machine (i.e., a hardware device) configured for implementing network communications with other physical machines via the data network 10 (e.g., within a sensor data network). The term "configured for" or "configured to" as used herein with respect to a specified operation refers to a device and/or machine that is physically constructed and arranged to perform the specified operation.

Each apparatus 12 and/or 14 can include a device interface circuit 30, a processor circuit 32, and a memory circuit 34. The device interface circuit 30 can include one or more distinct IEEE based transceivers for communications with the devices of FIG. 1A via any of the wireless data links shown in FIG. 1. The device interface circuit 30 can include one or more physical layer transceiver circuits, one or more MAC layer circuits 36, etc. and can configured for executing TSCH (e.g., 6TiSCH) based communications with one or more other device 12 and/or 14.

The processor circuit 32 can be configured for executing any of the operations described herein, and the memory circuit 34 can be configured for storing any data structures or data frames as described herein. Any of the data structures or data frames described herein also can be stored in an internal memory circuit within the device interface circuit 30.

Any of the disclosed circuits of the devices 12 and/or 14 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a frame" (or the like) can be implemented based on creating the message/frame in the form of a data structure and storing that data structure in a non-transitory tangible memory medium in the disclosed apparatus (e.g., in a transmit buffer). Any reference to "outputting a message" or "outputting a frame" (or the like) also can include electrically transmitting (e.g., via wired electric current or wireless electric field, as appropriate) the message/frame stored in the non-transitory tangible memory medium to another network node via a communications medium (e.g., a wired or wireless link, as appropriate) (optical transmission also can be used, as appropriate). Similarly, any reference to "receiving a message" or "receiving a frame" (or the like) can be implemented based on the disclosed apparatus detecting the electrical (or optical) transmission of the message/frame on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

Figure 4A:
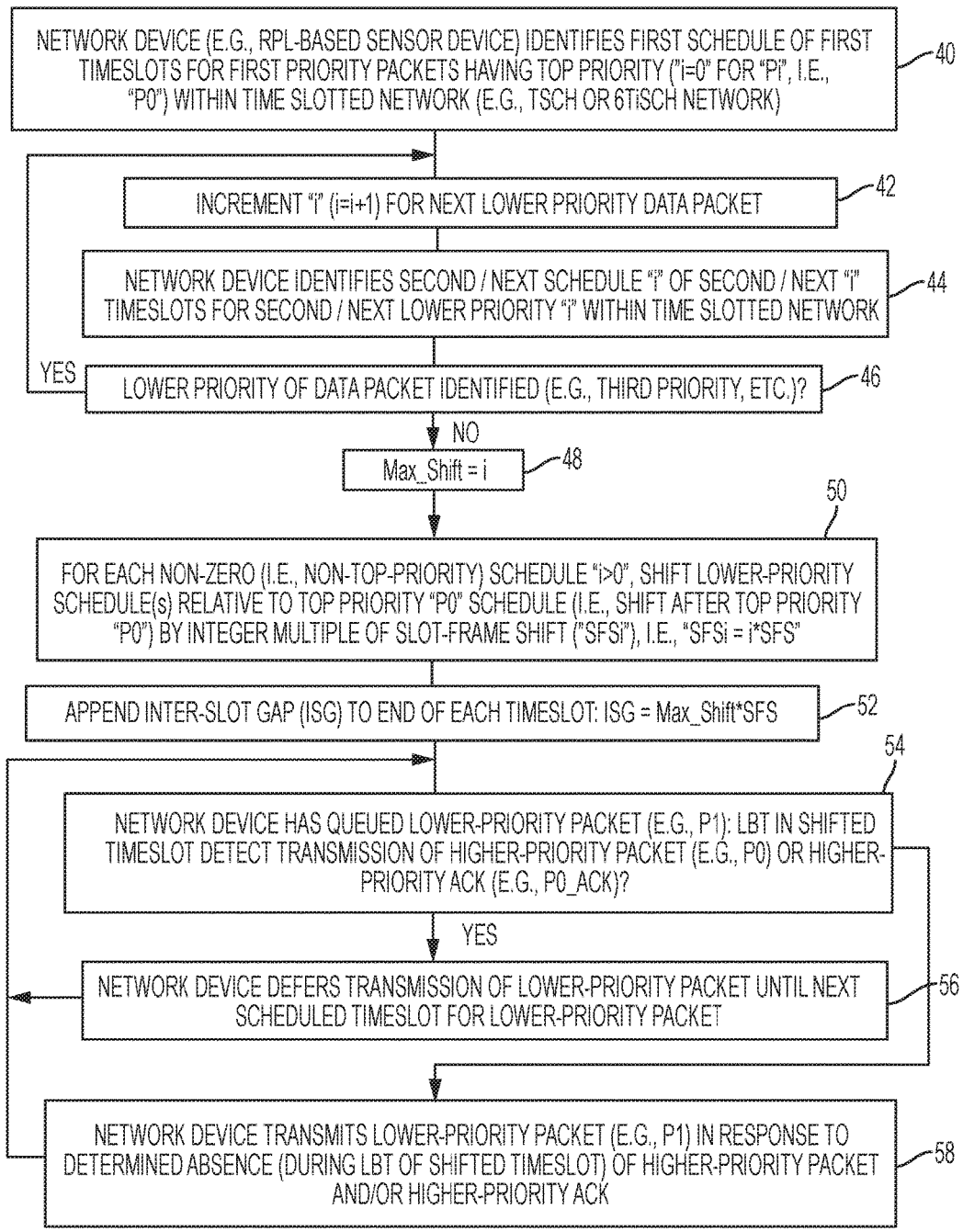

FIGS. 4A and 4B illustrate an example method of shifting, in the time slotted network of FIG. 1, the second schedule by the SFS interval relative to the first schedule, according to an example embodiment. FIGS. 5A-5D illustrate example shifting of the second schedule by example SFS intervals, according to an example embodiment. The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 4, the processor circuit 32 of any network device 12 or the controller device 14 in operation 40 can identify a higher-priority schedule 18a of higher-priority timeslots 20a for the highest priority packet "P0" within the data network 10. As described previously, each network device 12 can be implemented as a physical device in various forms, for example a mobile device such as a laptop or smart phone, an unmanned aerial vehicle, a low-power wireless sensor "mote" in a wireless sensor network, etc.; hence, each of these devices can be configured for operating under the Routing Protocol for Low Power and Lossy Networks (RPL) as described in RFC 6550, and/or IEEE 802.15.4e TSCH mode, ISA 100.A, 6TiSCH, etc. Each network device 12 can identify each of the priorities (e.g., P0, P1, P2, . . . Pn) (i.e., Pi where i=0 to n) based on manual configuration by a network administrator, or by autoconfiguration by the controller device 14 that sends configuration commands to each of the network devices 12 prior to initiation of network traffic according to the schedules 18. The device interface circuit 30 of each network device 12 also can identify, for the top-priority Hence, the processor circuit 32 in each network device 12 or the controller device 14 in operation 40 can identify a first schedule 18*a* of the higher-priority timeslots 20*a* allocated for transmission and reception of packets 22 having the corresponding highest priority "P0" (i.e., i=0), for example either based on manual configuration, configuration by the controller device 14 operating as a PCE (or another control entity), etc. As illustrated in FIG. 1, the processor circuit 32 of the network device "A" 12 in operation 40 identifies allocation of the higher-priority schedule 18*a* identifying the transmit timeslot "Tx" 20*a* that occurs at the first timeslot instance (e.g., at event 24) in the contiguous sequence of timeslots, and the receive timeslot "Rx" 20*a* that occurs at the third timeslot instance (e.g., at event 25); the processor circuit 32 of the network device "C" 12 in operation 40 identifies for the highest priority "P0" schedule 18*a* the receive timeslot "Rx" 20*a* that occurs at the second timeslot instance (e.g., at event 36), and the transmit timeslot "Tx" 20*a* that occurs at the fourth timeslot instance (e.g., at event 38).

The processor circuit 32 in each network device 12 or the controller device 14 can identify in operation 42 the next lower priority packet (e.g., "P1"), for example by incrementing a priority counter (e.g., Pi based on i=i+1), and identifying in operation 44 the corresponding lower-priority schedule 18*b* for the lower-priority timeslots 20*b* allocated to the network device for transmitting or receiving the lower priority packet (e.g., "P1"). As illustrated in FIG. 1, the identification in operation 44 of the lower-priority schedule 18*b* can be based on manual configuration, and/or configuration by the controller device 14 operating as a PCE (or another control entity), etc.

As illustrated in FIG. 1, the processor circuit 32 of the network device "A" 12 in operation 44 identifies allocation of the lower-priority schedule 18*b* for the lower-priority "P1" including the transmit timeslot "Tx" 20*b* that occurs at the third timelsot instance (e.g., at event 25) in the contiguous sequence of timeslots (the receive timeslot "Rx" for the lower-priority "P1" of the network device "A" 12 is not shown in FIG. 1); the processor circuit 32 of the network device "C" 12 in operation 44 identifies for the lower priority "P1" schedule 18*a* the transmit timeslot "Tx" 20*b* that occurs at the first timeslot instance (e.g., at event 24), and the receive timeslot "Rx" 20*b* that occurs at the fourth timeslot instance (e.g., at event 38).

If in operation 46 the processor circuit 32 of a network device 12 or the controller device 14 determines there are additional priorities of data packets (e.g., a third priority "P2"), the processor circuit 32 of the network device 12 or the controller device 14 can repeat operations 42 and 44 to identify a third schedule 18 of timeslots 20 for the third priority "P2" that is lower in priority than "P2", i.e., in terms of priority "Pn< . . . <P2<P1<P0", where "n" represents the lowest priority from i=0 to n. Hence, operations 42 and 44 can repeated for each lower-priority packet until the schedule 18 is identified for the lowest priority "Pn".

As apparent from the foregoing, the allocation of timeslots can be based on setting schedules within a prescribed repeating sequence, for example as part of a channel distribution/usage (CDU) matrix in 6TiSCH; further, it is possible that different schedules can be established for the different priorities, such that the occurrence of coinciding timeslots as described herein is unintentional during initial configuration and deployment; rather, the coinciding timeslots can occur following any number of repetitions of a prescribed schedule.

The lowest priority "i=n" is stored by the processor circuit 32 of a network device 12 or the controller device 14 in operation 48 as a "maximum shift" ("Max_Shift=i") (e.g., in the memory circuit 34) in order to enable the processor circuit 32 set the interslot gap interval 28 in operation 52, described below.

The processor circuit 32 in each network device 12 or the controller device 14 in operation 50 is configured for shifting each non-zero (i.e., non-top-priority, "Pi" where "i>0") schedule, relative to the top priority schedule "P0", by a corresponding integer multiple of the slot frame shift minimum value "SFS" multiplied by the relative non-zero priority (i.e., "SFSi=i*SFS"); in other words, the slot-frame shift interval 16 for the priority "P1" schedule is "SFS1=1*SFS"; the slot-frame shift interval 16 for the priority "P2" schedule is "SFS2=2*SFS"; the slot-frame shift interval 16 for the priority "P3" schedule is "SFS3=3*SFS", etc., up to the slot-frame shift interval 16 for the priority "Pn" schedule is "SFSn=n*SFS".

The processor circuit 32 in each network device 12 or the controller device 14 in operation 52 is configured for appending, to each of the timeslots 20, the interslot gap (ISG) 28 that is equal to the integer multiple "Max_Shift" of the minimum SFS interval 16, i.e., "ISG=Max_Shift*SFS", illustrated in FIG. 2.

Hence, following shifting the respective schedules of timeslots allocated for transmission and reception of data packets of the respective non-priority packets "P1", "P2", . . . "Pn", the network devices 12 can begin timeslotted communications in operations 54, 56, and 58 using the shifted timeslots in the lower-priority packets for collision avoidance. For example, assume in operation 54 in FIG. 1 the network device "C" 12 has a priority "P1" packet queued for transmission during its first lower-priority timeslot "Tx" 20*b* at event 24, and the network device "A" 12 has a highest-priority "P0" packet queued for transmission during its first higher-priority timeslot "Tx" 20*a* at event 24. As illustrated in FIGS. 1 and 2, the lower-priority schedule 18*b* in the network device "C" 12 is shifted by the slot-frame shift interval 16, enabling the processor circuit 32 (and/or the device interface circuit 30) of the network device "C" 12 to detect in operation 54, during the corresponding listen-before-talk interval 26, whether there is any transmission 60 of the highest-priority data packet "P0" in the higher-priority timeslot 20*a* by the network device "A" 12. Hence, in response to detecting (during the listen-before-talk interval 26) a transmission 60 of the highest-priority data packet "P0" the processor circuit 32 (and/or the device interface circuit 30) of the network device "C" 12 in operation 56 can defer transmission of the lower-priority packet ""P1" until the next transmit opportunity in the lower-priority schedule 18*b*.

Alternately, if in operation 54 the network device "C" 12 has a priority "P1" packet queued for transmission during its lower-priority timeslot "Tx" 20*b* at event 24, but the network device "A" 12 has no highest-priority "P0" packet queued for transmission at event 24, then the processor circuit 32 (and/or the device interface circuit 30) of the network device "C" can transmit in operation 58 its lower-priority packet "P1" 62 in response to a determined absence of any transmission of a "P0" priority packet 60 during the listen-before-talk interval 26. Hence, the slot-frame shift interval 16 provides a collision avoidance between two network devices 12 having coinciding timeslots 20 for different-priority packets in a time slotted network.

As described previously, the slot-frame shift interval 16 also avoids the "lost slot" problem in a network device 16. As illustrated in FIG. 1, assume with respect to operation 54 that the network device "A" 12 has a priority "P1" packet queued for transmission during its third lower-priority timeslot "Tx" 20b at event 25, and a highest-priority "P0" packet queued for reception during its coinciding third higher-priority timeslot "Rx" 20a also at event 25. As illustrated in FIGS. 1 and 2, the lower-priority schedule 18b in the network device "A" 12 is shifted by the slot-frame shift interval 16 relative to the higher-priority schedule 18a, enabling the processor circuit 32 (and/or the device interface circuit 30) of the network device "A" 12 to detect in operation 54, during the corresponding listen-before-talk interval 26, whether there is any reception 64 of a highest-priority data packet "P0" (e.g., from the root network device "R"12) in the higher-priority timeslot 20a by the network device "A" 12 at event 25. Hence, the processor circuit 32 (and/or the device interface circuit 30) of the network device "A" 12 in operation 56 can defer transmission of the lower-priority packet "P1" until the next transmit opportunity in the lower-priority schedule 18b, in response to detecting the reception 64 of the highest-priority data packet "P0" during the higher-priority timeslot 20a. Alternately, if in operation 54 the processor circuit 32 (and/or the device interface circuit 30) of network device "A" determines an absence of any packet 22 having the highest priority "P0" during the listen-before-talk interval 26 (i.e., there is no transmission 60 nor reception 64 of a highest-priority packet "P0"), then the processor circuit 32 (and/or the device interface circuit 30) of the network device "A" can transmit in operation 58 its lower-priority packet "P1" 66 in response to a determined absence of any transmission of a "P0" priority packet during the listen-before-talk interval 26, ensuring the transmit opportunity for lower-priority packets is not lost.

FIG. 4B illustrates in further detail example settings for the slot-frame shift interval 16 and/or the listen-before-talk interval 26, according to an example embodiment. The example settings for the slot-frame shift interval 16 and/or the listen-before-talk interval 26 can be optimized depending on network deployment, for example to minimize collisions between network devices, to minimize lost transmit opportunities, to adjust the slot-frame shift interval 16 based on the relative synchronization between neighboring network devices, based on whether timing settings are set to existing protocols such as IEEE 802.15.4e timeslot settings or alternate settings, etc.

For example, the processor circuit in any network device 12 or in the controller device 14 in operation 70 can optimize the slot-frame shift interval 16 for lost-slot avoidance (as illustrated previously in FIG. 1 with respect to network device "A" at event 25), based on setting the listen-before-talk interval 26 to start at or after the latest instance 72 permitted for initiating reception 64 of the higher-priority packet "P0", illustrated for example in FIG. 5A as the end of the "tsRxWait" interval 74 following the "tsRxOffset" interval 76 described in IEEE 802.15.4e. The "tsRxWait" interval 74 refers to the time to wait for the start of packet after the "tsRxOffset" 76, which refers to the interval from beginning of the timeslot 20 to when the receiver must be listening for transmissions. The "tsRxTx" interval 78 refers to the transmit mode to receive turnaround time, i.e., the time limit in which a transceiver must switch from transmit mode to receive mode (or vice versa) (e.g., 12 symbols); the "tsTxOffset" interval 80 refers to the time interval between the beginning of the timeslot 20 and the start of packet transmission; and the "tsCCA" interval 82 refers to the duration of the listen-before-talk interval 26.

Hence, in one example in operation 70 the processor circuit 32 of a network device 12 or the controller device 14 can set the slot-frame shift interval 16 to one example implementation (16a of FIG. 5A) that causes the corresponding listen-before-talk interval 26 in the lower-priority timeslot 20b to be initiated at or after the latest instance 72 for initiating receiving 64 of the higher priority packet "P0". For example, in the case of an unbalanced guard time (where the transmit and receive guard times have unequal values), the slot-frame shift interval 16a can be determined as the sum of the "tsRxOffset" interval 76, the "tsRxWait" interval 74 and the "tsRxTx" interval 78, minus the "tsTXOffset" interval 80; alternately, in the case of balanced guard times (e.g., equal transmit and receive guard times), the slot-frame shift interval 16a can be set to equal half of the "tsRxWait" interval 74 plus the "tsRxTx" interval 78. The use of guard times is based on the relative synchronization between the network devices 12 in the data network 10: if the network devices 12 are substantially synchronized (i.e., their timeslots 20 can start within about 32 microseconds (μs) of each other), then little or no guard times may be needed; if the network devices 12 are not substantially synchronized, larger guard times may be needed.

If default IEEE 802.15.14e timeslot values are used in operation 70, the slot-frame shift interval 16a can be set to have an example value of 1392 microseconds (μs), based on the default IEEE 802.15.4e timeslot values shown in Table 1 below:

TABLE 1

IEEE 802.15.4e Default Timeslot Durations

| Attribute | Default Duration in Microseconds (μs) |
| --- | --- |
| tsCCAOffset | 1800 |
| tsCCA | 128 |
| tsTXOffset | 2120 |
| tsRxOffset | 1120 |
| tsRxAckDelay | 1000 |
| txTxAckDelay | 1000 |
| tsRxWait | 2200 |
| tsAckWait | 400 |
| tsRxTx | 192 |
| tsMaxAck | 2400 |
| tsMaxTx | 4256 |
| tsEndOfSlot | 224 |
| tsTimeslotLength | 10000 |

Figure 5B:
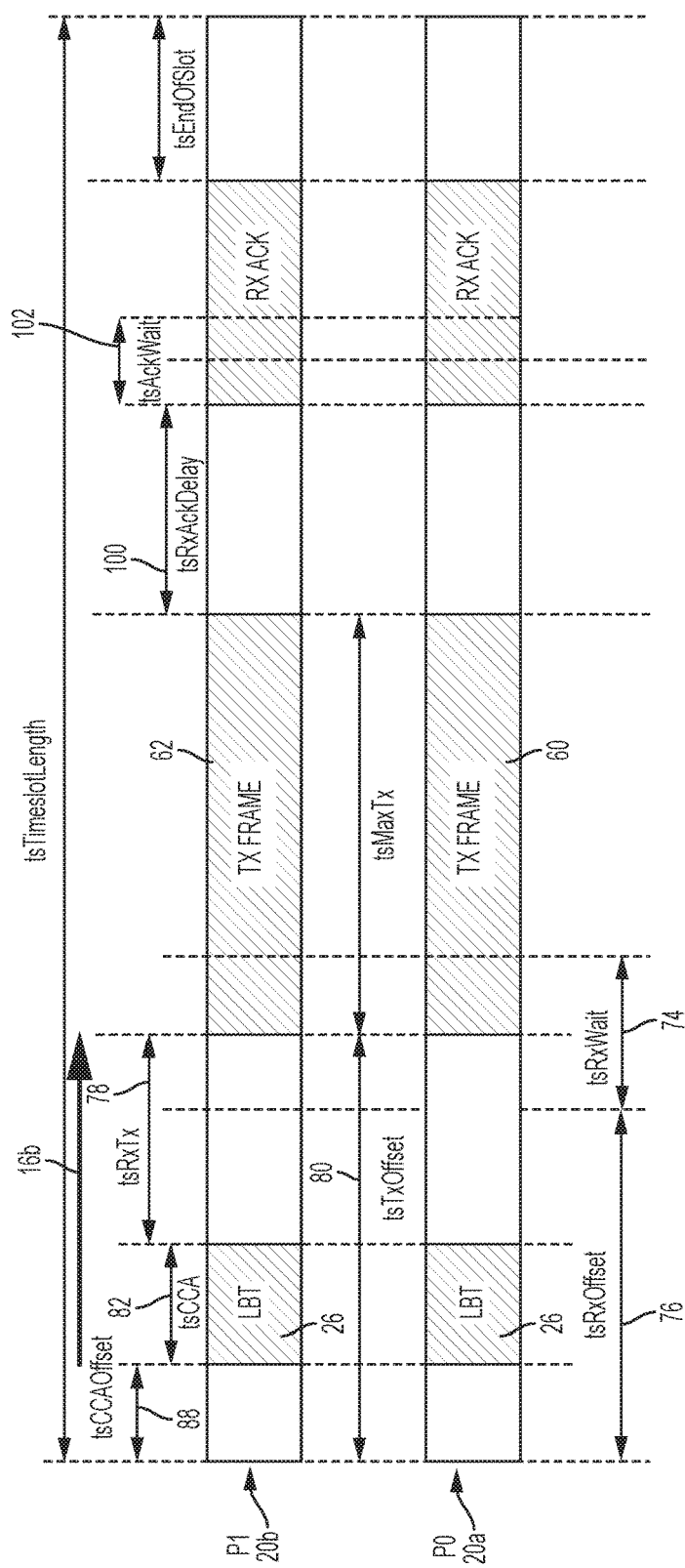

The processor circuit in any network device 12 or in the controller device 14 in operation 84 alternately can optimize the slot-frame shift interval 16 for collision avoidance between neighboring devices having coinciding timeslots (as illustrated previously in FIG. 1 with respect to network devices "A" and "C" 12 at event 24), for example based on setting the slot-frame shift interval 16b in FIG. 5B to a minimal value assuming no guard time based on the network devices 12 being substantially synchronized, for example, within about 32-64 microseconds. Assuming the network devices 12 are substantially synchronized so that guard times are not needed, the minimal slot-frame shift interval 16b can be set (by the processor circuit 32 in a network device 12 or the controller device 14) based on identifying, within the higher-priority timeslot 20a, the earliest transmission instance 86 for enabling the transmission 60 for any high-priority packet "P0" (e.g., the expiration of the "tsTx-Offset" interval 80), and setting the slot-frame shift interval 16b to cause the corresponding listen-before-talk interval 26 in the lower-priority timeslot 20b to be initiated at the earliest transmission instance 86. In one example, the minimal slot-frame shift interval 16b can set to equal the sum of the "tsCCA" interval 82 and the "tsRxTx" interval 78 (assuming no guard times), for example a duration of 320 microseconds (assuming default IEEE 802.15.4e values).

Figure 5C:
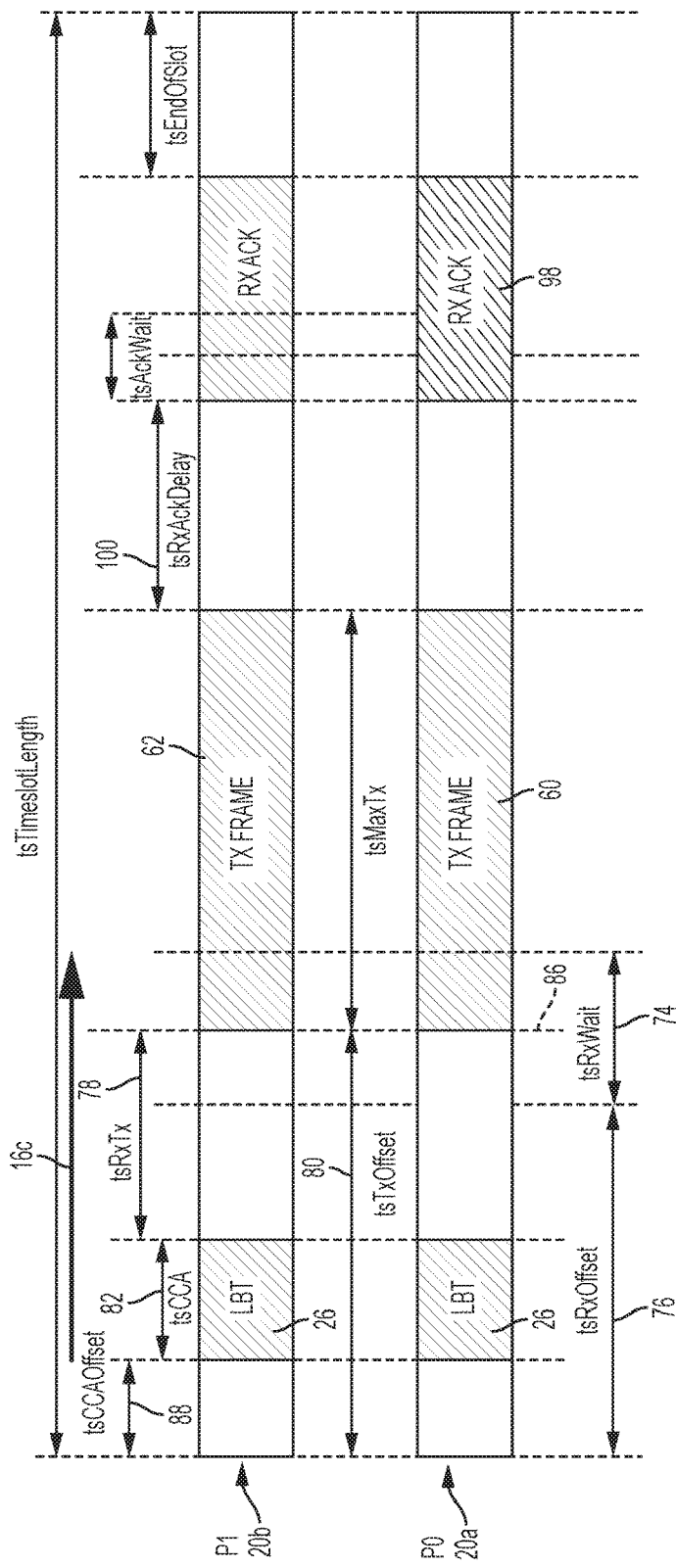

If in operation 84 guard times are needed due to the network devices 12 not being substantially synchronized, the slot-frame shift interval 16b can be set, as illustrated in FIG. 5C, after the earliest transmission instance 86 by taking into account guard times, as needed, for example by setting the slot-frame shift interval 16c to be greater than or equal to the "tsRxWait" interval 74 plus the "tsRxOffset" interval 76, minus the "tsCCAOffset" interval 88 for unbalanced guard times, for example 1520 microseconds using IEEE 802.15.4e default timeslot values. The "tsCCAOffset" interval 88 is referred to as the time interval between the beginning of the timeslot 20 and the start of the "tsCCA" interval 82 (i.e., the initiation of the listen-before-talk interval 26). If a balanced guard time is used, the slot-frame shift interval 16c can be set to be greater than or equal to one-half the "tsRxWait" interval 74 plus the "tsRxTx" interval 78 plus the "tsCCA" interval 82, for example 1420 microseconds using IEEE 802.15.4e default timeslot values.

Figure 5D:
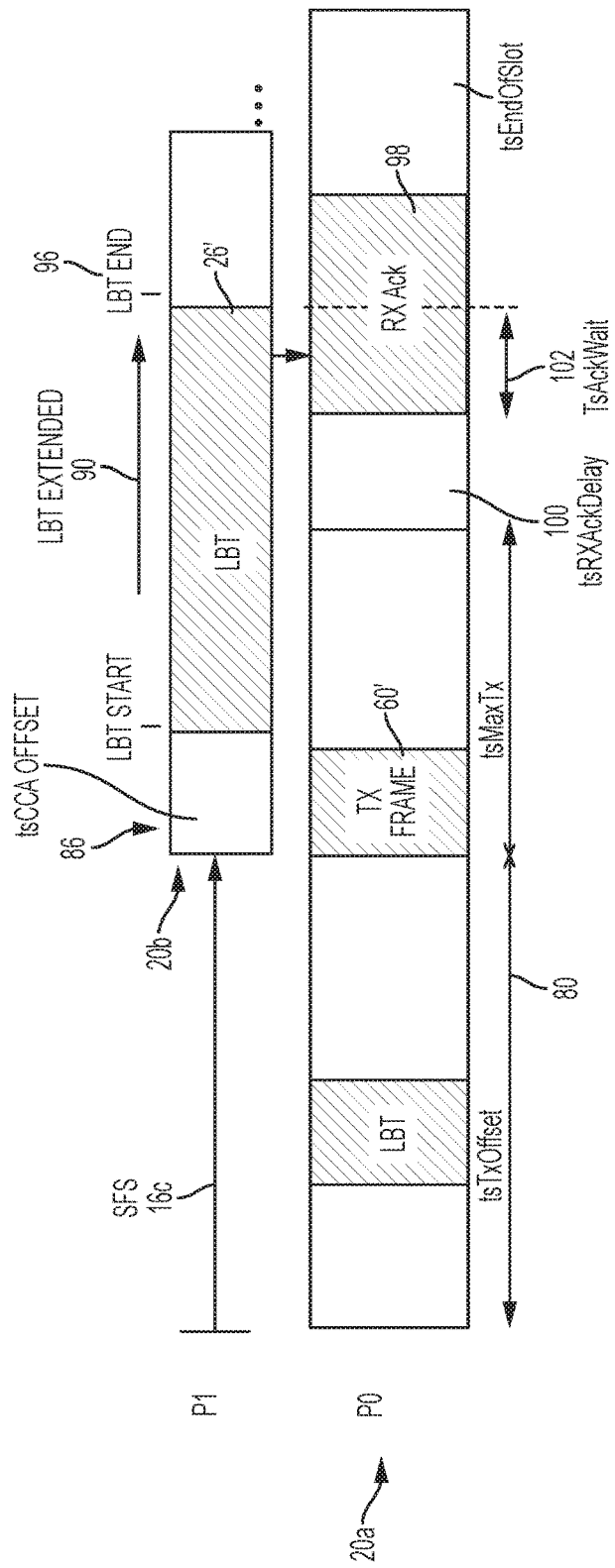

As illustrated in FIG. 5D, instances may arise if the slot-frame shift interval 16c is extended such that the listen-before-talk interval 26 starts after the earliest transmission instance 86 (as in FIG. 5C) where a substantially short transmission 60' may cause the transmission of the priority frame "P0" to be completed before initiation of the listen-before-talk interval 26. Hence, the processor circuit 32 of a network device 12 or the controller device 14 can cause the listen-before-talk interval 26 to be extended in operation 90 beyond the "tsCCA" interval 82, such that even if the start 94 of the modified listen-before-talk interval 26' is after the completed transmission 60' of the priority packet "P0", the end 96 of the modified listen-before-talk interval 26' can detect at least a portion of the corresponding acknowledgement "Rx Ack" 98 to the transmission 60' of the priority packet "P0".

Hence, the extended duration 90 of the modified listen-before-talk interval 26' enables detection in the higher-priority timeslot 20a of any one of the transmission 60 of the priority packet "P0", or detection in the higher-priority timeslot 20a of the acknowledgement "Rx Ack" 98 indicating reception of the priority packet "P0". As illustrated in FIGS. 4B and 5D, the modified listen-before-talk interval 26 ("tsCCA") can be set to be greater than the "tsRxAckDelay" interval 100 (referred to as the time interval between the end of packet transmission 60 or 60' to the time instance that the transceiver in the device interface circuit 30 must begin to listen for the acknowledgement 98) plus the "tsAckWait" interval 102, for example 1400 microseconds using IEEE 802.15.4e default timeslot values. The duration of the modified listen-before-talk interval 26' can be substantially reduced from the example 1400 microseconds, for example based on relying on a media access control (MAC) layer based hardware circuit (e.g., a crypto decoder circuit in the device interface circuit 30) that can generate a valid decode signal indicating that the "P0" data packet was properly decoded; in other words, the valid decode signal can be an example of the acknowledgement "Rx Ack" 98, eliminating the reliance on a higher-layer acknowledgement packet to detect the transmission 60 of the higher-priority data packet "P0".

According to example embodiments, timeslots in non-priority schedules are successively shifted in a time slotted network, enabling a time slotted network having multiple overlapping schedules for different-priority packets to ensure priority-based transmission and reception of data packets, while avoiding collisions between different priority packets due to coinciding timeslots; the example embodiments also enable a network device having multiple prioritized packets queued to transmission to share an overlapping timeslot, without "losing" a transmit opportunity while waiting for a higher-priority reception.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
a network device identifying, in a time slotted network that is allocated a plurality of timeslots for exclusive control of data transmissions with at least a second network device, a first schedule of first timeslots allocated for transmission and reception of packets having a first priority and a second schedule of second timeslots allocated for transmission and reception of packets having a second priority lower than the first priority, the second schedule overlapping the first schedule; and
the network device shifting the second schedule of second timeslots, relative to the first schedule, by a slot-frame shift (SFS) interval that causes a corresponding listen-before-talk interval in each of the second timeslots to be initiated coincident with or after transmission is enabled for any packet having the first priority;
wherein the shifting includes:
identifying, within a first timeslot, an earliest transmission instance for enabling the transmission for any packet having the first priority; and
setting the SFS interval to cause the corresponding listen-before-talk interval in a second timeslot to be initiated after the earliest transmission instance.

2. The method of claim 1, further comprising:
the network device identifying a third schedule of third timeslots allocated for transmission and reception of packets having a third priority lower than the second priority, the third schedule overlapping the first and second schedules; and
the network device shifting the third schedule of third timeslots, relative to the second schedule, by the SFS interval that causes the corresponding listen-before-talk interval in each of the third timeslots to be initiated coincident with or after transmission is enabled for any packet having the second priority.

3. The method of claim 2, further comprising appending, to each of the second timeslots and third timeslots, an interslot gap equal to an integer multiple of the SFS interval, the integer equal to a number of the priorities lower than the first priority.

4. The method of claim 1, further comprising appending, to each of the second timeslots, an interslot gap equal to an integer multiple of the SFS interval, the integer equal to a number of the priorities lower than the first priority.

5. The method of claim 1, wherein the shifting includes:
identifying within a first timeslot, allocated for reception by the network device of a packet having the first priority, a latest instance for initiating receiving of the packet having the first priority, and
setting the SFS interval to cause the corresponding listen-before-talk interval in a second timeslot to be initiated after the latest instance for initiating receiving of the packet having the first priority;
the method further comprising transmitting one of the packets having the second priority, within a corresponding second timeslot, in response to a determined absence during the corresponding listen-before-talk interval in the corresponding second timeslot of any packet having the first priority.

6. The method of claim 1, further comprising extending a duration of the listen-before-talk interval in the second timeslot to enable detection in the first timeslot of any one of the transmission of the packet having the first priority, or detection in the first timeslot of an acknowledgement indicating reception of the packet having the first priority.

7. An apparatus comprising:
a processor circuit configured for identifying, in a time slotted network that is allocated a plurality of timeslots for exclusive control of data transmissions, a first schedule of first timeslots allocated for transmission and reception of packets having a first priority and a second schedule of second timeslots allocated for transmission and reception of packets having a second priority lower than the first priority, the second schedule overlapping the first schedule;
the processor circuit further configured for shifting the second schedule of second timeslots, relative to the first schedule, by a slot-frame shift (SFS) interval that causes a corresponding listen-before-talk interval in each of the second timeslots to be initiated coincident with or after transmission is enabled for any packet having the first priority; and
a device interface circuit configured for transmitting one of the packets having the second priority, within a corresponding second timeslot, in response to a determined absence during the corresponding listen-before-talk interval in the corresponding second timeslot of any packet having the first priority;
wherein the processor circuit is configured for:
identifying, within a first timeslot, an earliest transmission instance for enabling the transmission for any packet having the first priority; and
setting the SFS interval to cause the corresponding listen-before-talk interval in a second timeslot to be initiated after the earliest transmission instance.

8. The apparatus of claim 7, wherein the processor circuit is configured for:
identifying a third schedule of third timeslots allocated for transmission and reception of packets having a third priority lower than the second priority, the third schedule overlapping the first and second schedules; and
shifting the third schedule of third timeslots, relative to the second schedule, by the SFS interval that causes the corresponding listen-before-talk interval in each of the third timeslots to be initiated coincident with or after transmission is enabled for any packet having the second priority.

9. The apparatus of claim 8, wherein the processor circuit is configured for appending, to each of the second timeslots and third timeslots, an interslot gap equal to an integer multiple of the SFS interval, the integer equal to a number of the priorities lower than the first priority.

10. The apparatus of claim 7, wherein the processor circuit is configured for appending, to each of the second timeslots, an interslot gap equal to an integer multiple of the SFS interval, the integer equal to a number of the priorities lower than the first priority.

11. The apparatus of claim 7, wherein the processor circuit is configured for:
identifying within a first timeslot, allocated for reception by the network device of a packet having the first priority, a latest instance for initiating receiving of the packet having the first priority, and
setting the SFS interval to cause the corresponding listen-before-talk interval in a second timeslot to be initiated after the latest instance for initiating receiving of the packet having the first priority.

12. The apparatus of claim 7, wherein the processor circuit is configured for extending a duration of the listen-before-talk interval in the second timeslot to enable detection in the first timeslot of any one of the transmission of the packet having the first priority, or detection in the first timeslot of an acknowledgement indicating reception of the packet having the first priority.

13. One or more non-transitory tangible media encoded with logic for execution by a machine and when executed by the machine operable for:
the machine implemented as a network device identifying, in a time slotted network that is allocated a plurality of timeslots for exclusive control of data transmissions with at least a second network device, a first schedule of first timeslots allocated for transmission and reception of packets having a first priority and a second schedule of second timeslots allocated for transmission and reception of packets having a second priority lower than the first priority, the second schedule overlapping the first schedule; and
the network device shifting the second schedule of second timeslots, relative to the first schedule, by a slot-frame shift (SFS) interval that causes a corresponding listen-before-talk interval in each of the second timeslots to be initiated coincident with or after transmission is enabled for any packet having the first priority;
wherein the shifting includes:
identifying, within a first timeslot, an earliest transmission instance for enabling the transmission for any packet having the first priority; and
setting the SFS interval to cause the corresponding listen-before-talk interval in a second timeslot to be initiated after the earliest transmission instance.

14. The one or more non-transitory tangible media of claim 13, further operable for:
the network device identifying a third schedule of third timeslots allocated for transmission and reception of packets having a third priority lower than the second priority, the third schedule overlapping the first and second schedules; and
the network device shifting the third schedule of third timeslots, relative to the second schedule, by the SFS interval that causes the corresponding listen-before-talk interval in each of the third timeslots to be initiated coincident with or after transmission is enabled for any packet having the second priority.

15. The one or more non-transitory tangible media of claim 13, further operable for appending, to each of the second timeslots, an interslot gap equal to an integer multiple of the SFS interval, the integer equal to a number of the priorities lower than the first priority.

16. The one or more non-transitory tangible media of claim 13, wherein the shifting includes:
- identifying within a first timeslot, allocated for reception by the network device of a packet having the first priority, a latest instance for initiating receiving of the packet having the first priority, and
- setting the SFS interval to cause the corresponding listen-before-talk interval in a second timeslot to be initiated after the latest instance for initiating receiving of the packet having the first priority;
- the non-transitory tangible media further operable for transmitting one of the packets having the second priority, within a corresponding second timeslot, in response to a determined absence during the corresponding listen-before-talk interval in the corresponding second timeslot of any packet having the first priority.

17. The one or more non-transitory tangible media of claim 13, further operable for extending a duration of the listen-before-talk interval in the second timeslot to enable detection in the first timeslot of any one of the transmission of the packet having the first priority, or detection in the first timeslot of an acknowledgement indicating reception of the packet having the first priority.

* * * * *